United States Patent [19]

Werding

[11] Patent Number: 4,884,750

[45] Date of Patent: Dec. 5, 1989

[54] THRUST REGULATOR COMPRISING A MOUNTING ENCLOSURE

[76] Inventor: Winfried Werding, General Guisan 77, Pully, Switzerland, CH-1009

[21] Appl. No.: 44,495

[22] PCT Filed: Jul. 22, 1986

[86] PCT No.: PCT/CH86/00103

§ 371 Date: Mar. 20, 1987

§ 102(e) Date: Mar. 20, 1987

[87] PCT Pub. No.: WO87/00513

PCT Pub. Date: Jan. 29, 1987

[30] Foreign Application Priority Data

Jul. 23, 1985 [CH] Switzerland .......................... 3286/85
Nov. 15, 1985 [CH] Switzerland .......................... 4895/85

[51] Int. Cl.⁴ .......................... B05B 1/34; B05B 1/30
[52] U.S. Cl. .................................... 239/337; 239/464; 239/533.1; 239/572; 137/517
[58] Field of Search ................ 137/517, 521, 855, 843; 267/158, 163, 160; 239/533.1, 533.2, 533.13, 533.14, 572, 570, 575, 590.3, 590, 337, 463, 464; 138/45, 42; 222/55, 61, 394

[56] References Cited

U.S. PATENT DOCUMENTS

| | | | |
|---|---|---|---|
| 886,834 | 5/1908 | Michelin | 137/517 |
| 2,106,775 | 2/1938 | Trask | 137/517 X |
| 2,941,544 | 6/1960 | Peras | 138/45 X |
| 2,995,308 | 8/1961 | Ashkenaz | 239/590.3 X |
| 3,098,589 | 7/1963 | Graham | 239/575 X |
| 3,173,306 | 3/1965 | Hoag | 267/163 X |
| 4,122,978 | 10/1978 | Guimond et al. | 239/575 X |
| 4,322,037 | 3/1982 | Heeb | 239/337 |
| 4,401,272 | 8/1983 | McFron et al. | 239/590.3 X |
| 4,650,094 | 3/1987 | Werding | 239/533.1 X |
| 4,708,166 | 11/1987 | Kobold | 137/517 X |

FOREIGN PATENT DOCUMENTS

| | | |
|---|---|---|
| 1933401 | 1/1970 | Denmark . |
| 8202932 | 2/1982 | European Pat. Off. . |
| 1217791 | 5/1960 | France . |
| 783323 | 9/1957 | United Kingdom . |

Primary Examiner—Andres Kashnikow
Assistant Examiner—Kevin P. Weldon
Attorney, Agent, or Firm—Sherman and Shalloway

[57] ABSTRACT

A regulator is housed in the expulsion channel of an aerosol container inside which there is a product that is to be dispensed, this product being subject to an expulsion pressure originating from a compressed gas, the said regulator comprising a flexible disk (6) and a rigid disk (7), the latter presenting a protrusion (8) with grooves (9), and further comprising a sealing disk (12) with a central bore (13), and further comprising a nozzle (16). With the flexible disk (6), the grooves (9) in the rigid disk (7) form ducts for the expulsion of the product, and are oriented so as to form tangents to the circumference of the axial duct (10) of the rigid disk (7). This arrangement of the component parts creates turbulence effects in the flow of expelled product, and these effects are utilized to regulate the flow rate at which the product is expelled.

13 Claims, 9 Drawing Sheets

THRUST REGULATOR COMPRISING A MOUNTING ENCLOSURE

The present invention relates to a thrust regulator which comprises a mounting enclosure, this thrust regulator being intended to maintain the flow rates of liquid or cream-like products at values that remain at least approximately constant during the expulsion of these products from aerosol containers by means of compressed gas, in accordance with the precharacterizing clause of claim 1.

It is known that compressed gases, such as, for example, air or nitrogen, exhibit a pressure drop as soon as there is an increase in the volume of the container in which they are stored, such as occurs in the case of an aerosol container from which a product is being expelled. The flow rate of this product decreases in proportion to this fall in pressure. At the same time, when the product is atomized by means of a nozzle, there is an increase in the size of the droplets which are expelled, due to insufficient expulsion pressure.

U.S. Pat. No. 4,487,334 and International Patent Application No. PCT/CH83/00122, published under the number WO 84/01930, describe thrust regulators which modify the flow cross-section of a duct, with the aid of a piston which co-operates with a spring, doing so under the influence of the pressure which expels the product from the aerosol container, in such a way that when the pressure is high, the flow cross-section is small, and increases in proportion to the fall in expulsion pressure.

These regulators, manufactured in molded plastic, nevertheless demand very high precision if they are to function well, in the region of ±0.01 mm in the case of a piston diameter of less than 1 mm, such precision being very expensive. In fact, certain solvents, in particular methylene chloride, give rise to swelling of the plastic which is used, and this causes the piston to jam inside the expulsion duct and, in consequence, causes the system to become blocked.

The object of the present invention is to eliminate these problems, and to propose a thrust regulator of the type defined in claim 1, annexed hereto.

In the description which follows, preferred, non-limiting embodiments of the invention are described on the basis of the drawing, in which FIG. 1 a cross-sectional view of a press-to-actuate head, comprising a first embodiment of a regulator according to the invention.

Figure 1:
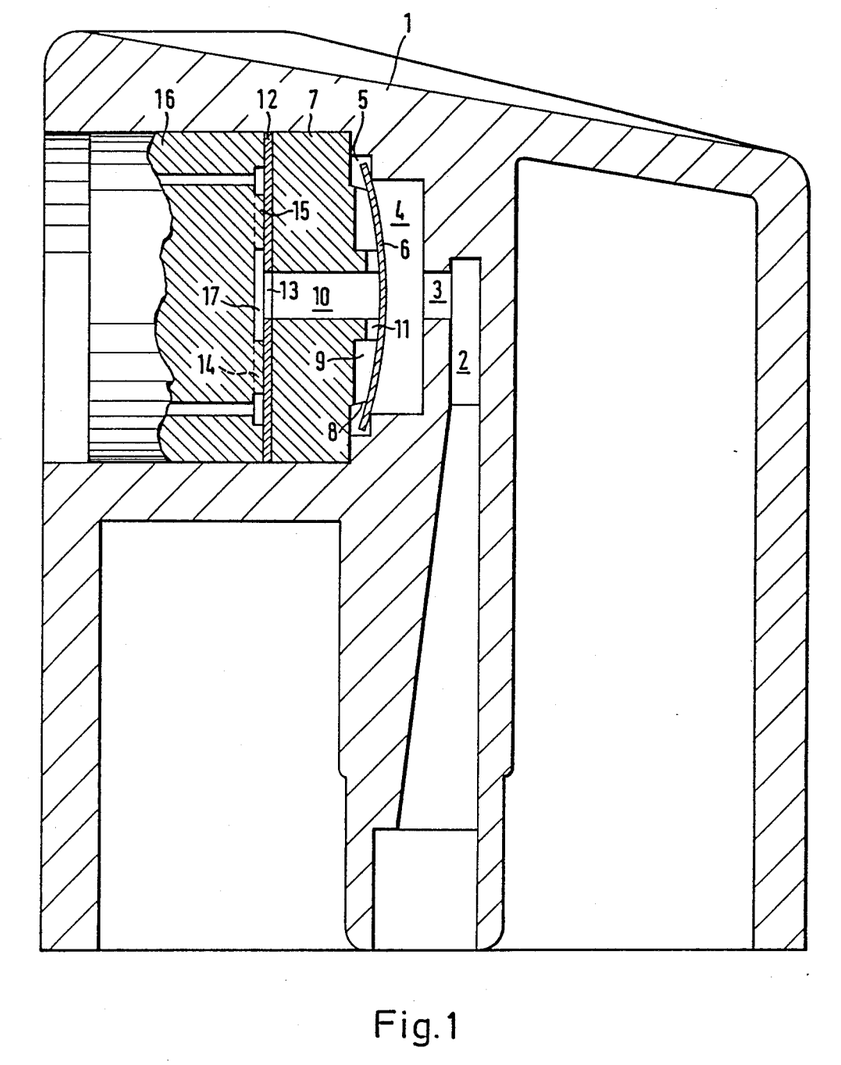
Figures 2, 3:
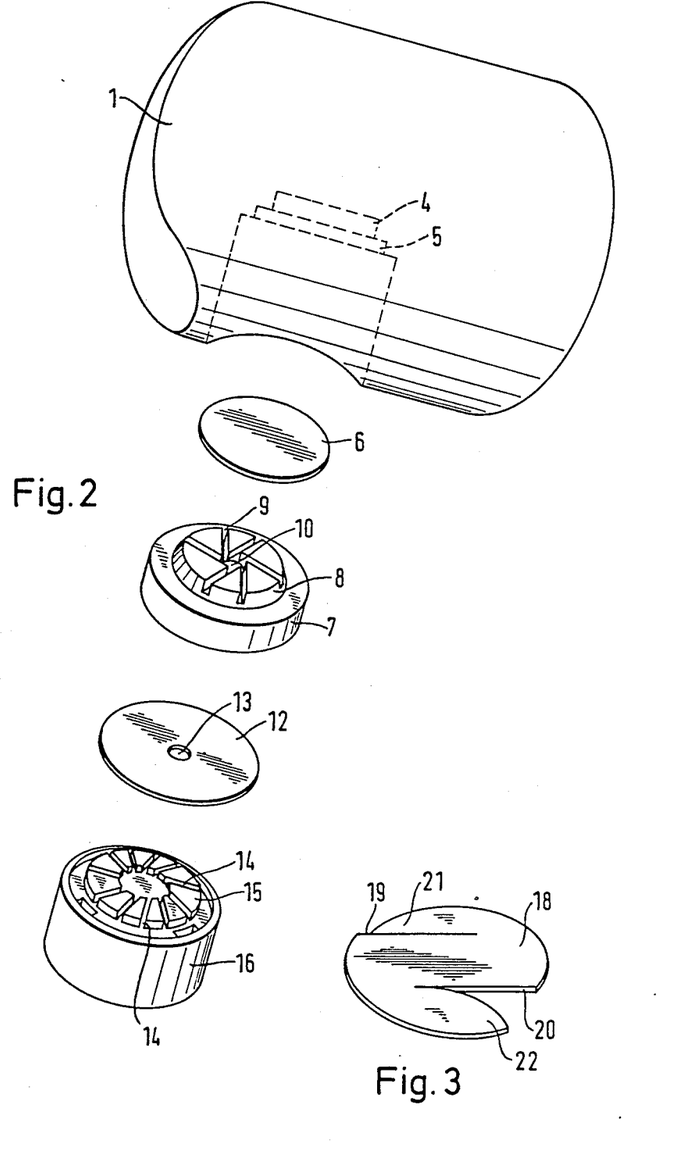
FIG. 2 shows an exploded view, in perspective, of a second embodiment of a regulator.
FIG. 3 shows a perspective view of a first variant of a regulating disk which a regulator contains.

FIGS. 1 and 2 show a regulator which is housed in a press-to-actuate head 1, associated with an aerosol valve which is not represented. A vertical duct 2, communicating with the valve, opens into a chamber, 4, which exhibits a widened region 5. The chamber 4 is closed-off by a flexible disk 6, which is preferably made of stainless steel, but which can also be composed of a plastic. The flexible disk 6 is housed in the widened region 5, where it is kept in place by means of a rigid disk 7. This disk 7 presents a convex protrusion, 8, which is provided with a plurality of grooves 9, arranged in a manner such that they form tangents to the circumference of an axial duct 10. The grooves 9 present steps, 11, which are intended to create turbulence effects in the product which is passing through the regulator, under pressure. The disk 7 bears against a sealing disk 12, which is also preferably made of stainless steel, and which is provided with a bore 13. A nozzle 16, presenting a protruding portion 15 and grooves 14, bears against the sealing disk 12, in a manner such that the grooves 14 act as ducts.

The PCT Application which has already been cited describes the appearance of turbulence effects when the flow of a pressurized liquid is deflected through a right angle in the presence of a rod, in this case a piston, located in the duct upstream, these turbulence effects constituting a flow-retarding force, and being capable of developing so far as to stop the outflow. This retarding force is directly proportional to the pressure under which the liquid is being expelled: the higher the pressure, the greater the retarding force.

The same Patent Application describes the automatic control of this retarding force, so as to regulate the thrust with which a product is expelled from an aerosol container. However, in this known application, the turbulence effects, and the retarding force which they create, depend also on the presence of a piston that is housed in a chamber 17 of the nozzle 16. If this piston is absent, the retarding force due to the turbulence effects is weaker.

In order to eliminate the necessity for a high-precision plastic molding for the purpose of obtaining the required quality of regulation, the present invention does not involve a piston. So as to compensate for the lack of turbulence-created retarding force, due to the lack of a piston, the convex protrusion 8 is provided with grooves 9, which become ducts by virtue of the fact that the flexible disk 6 bears hard against them. Because these ducts form tangents to the periphery of the axial duct 10 in the rigid disk 7, turbulence effects appear, creating a retarding force, adding to the retarding force which is created by the nozzle 16, but which is weakened by the lack of a piston, in such a way that the regulator, as described, is endowed with a two-stage "turbulator". Since the disk 6 is flexible, it allows itself to be deformed by the pressure under which the product is expelled, in such a way that, given the convexity of the protrusion 8, the ducts present minimum flow cross sections under a high expulsion pressure, these sections enlarging in proportion to any fall in the expulsion pressure, following an extremely small displacement of the flexible disk 6 in the upstream direction. For this reason, flow regulation is brought about just as effectively by the enlargement of the flow cross-sections of the ducts 9, following a fall in expulsion pressure, allowing the flexible disk 6 to relax, as by variations in the retarding force due to turbulence effects, following variations in the expulsion pressure.

The appearance of turbulence effects depends on the viscosity of the product which is to be expelled in order to be atomized by means of the nozzle 16. It has been noticed that, once the viscosity exceeds 8 centipoises, the retarding force due to the turbulence effects starts to decrease, if the regulator operates as described, just as does the quality of regulation. In order to make good this quality shortfall, the flexible disk 6 can be replaced by a regulating disk 18, as illustrated in FIG. 3. In a first variant, this regulating disk 18 exhibits notches, 19 and 20, from which the leaf springs 21 and 22 result. When the pressure under which the product is expelled is high, the leaf springs 21 and 22 are depressed, and close-off at least two of the ducts 9. The more the expulsion pressure falls, the more the leaf springs 21 and 22 relax, in a manner such that the closed-off ducts 9 are opened in like proportion. When the regulator operates in this way, the quality of regulation is provided partly by the turbulence effects, but predominantly by the variations in the flow cross-sections of the ducts 9.

Figure 4:
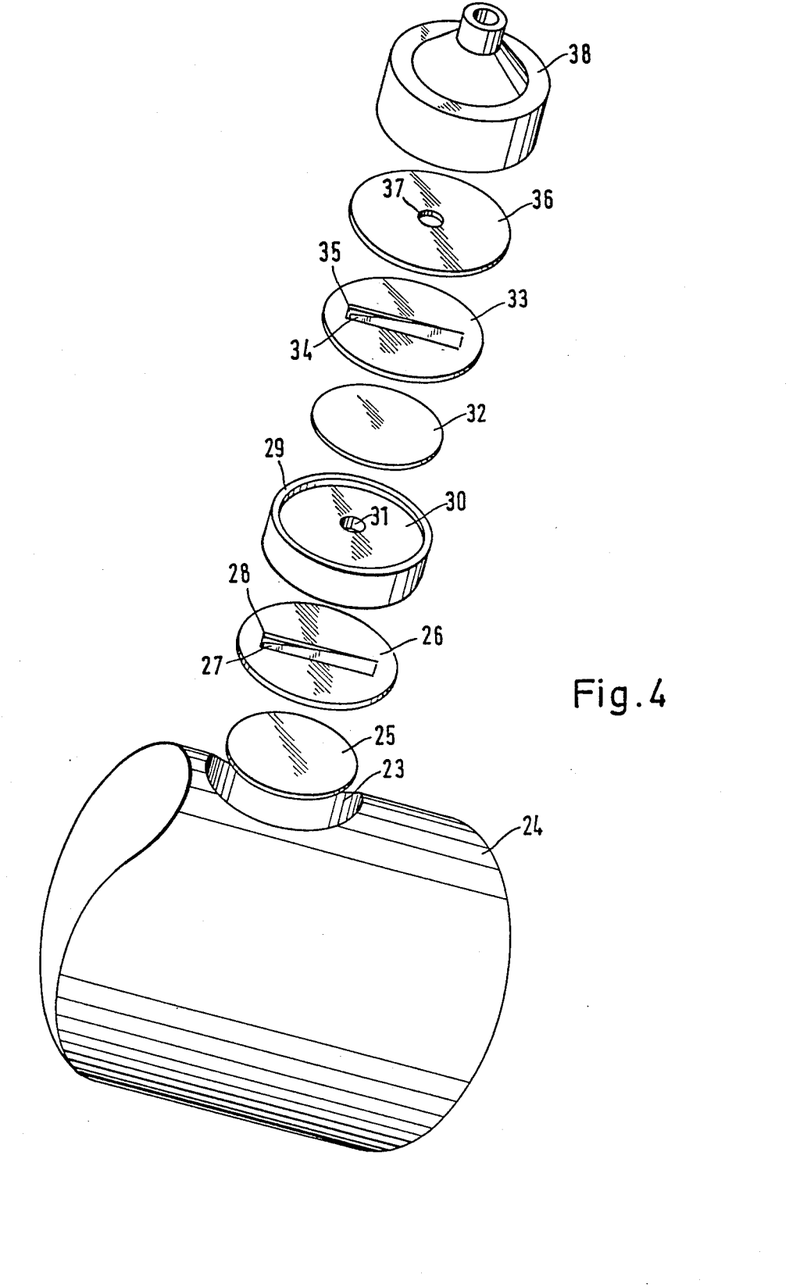
FIG. 4 shows an exploded view, in perspective, of a third embodiment of a regulator.

FIG. 4 presents another embodiment of a regulator, which is intended for dispensing viscous products, such as creams, oils, mustards, etc. Given that products of this kind, exhibiting high viscosities, do not generate turbulence effects, their flow rates have to be regulated solely by varying the flow cross-sections under the influence of the fall in the expulsion pressure provided by the compressed gases which are utilized.

Within a cylindrical seating 23 in a press-to-actuate head 24, are housed, upstream, a flexible disk 25, a first flexible regulating disk 26, presenting a leaf spring, 27, which can temporarily close a cut-out 28, a rigid disk 29, exhibiting a chamber 30 and an axial duct 31, the protrusion 8 not being visible, a flexible disk 32, a second flexible regulating disk 33, presenting a leaf spring, 34, which can temporarily close a cut-out 35, and a flexible disk 36, exhibiting a bore 37, the whole assembly being held in place by means of a dispensing device 38.

Figure 5:
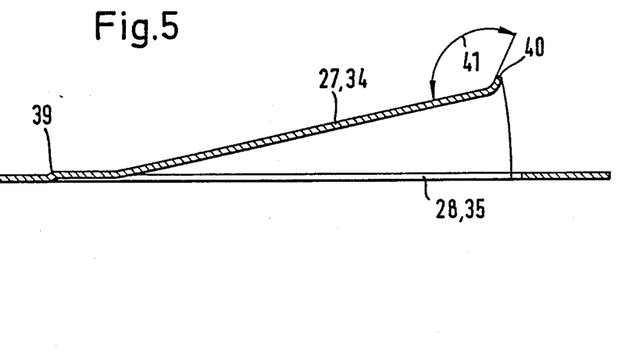
FIG. 5 shows a cross-sectional view of a second variant of a regulating disk which a regulator contains.
Figure 6:
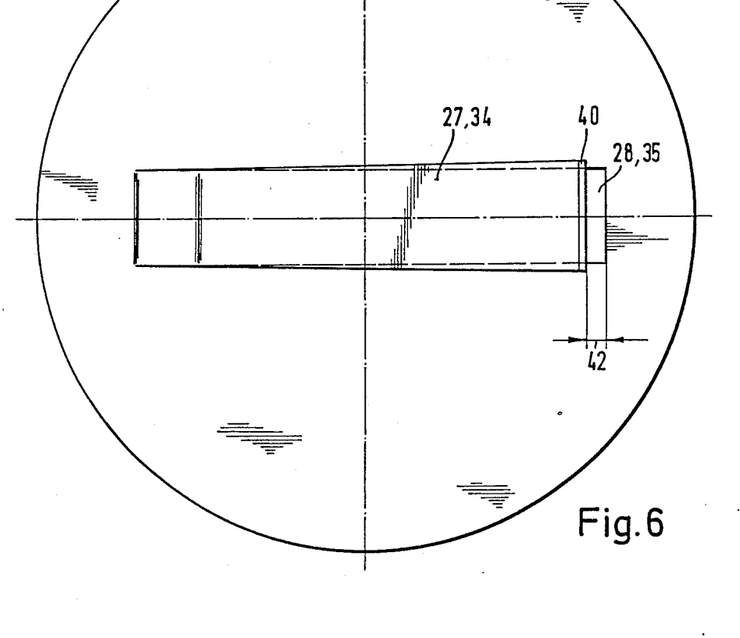
FIG. 6 shows, a plan view of the regulating disk shown in FIG. 5.

The design details of the two flexible regulating disks, 26 and 33, are illustrated in FIGS. 5 and 6, which show them in cross-section and plan view respectively. The leaf springs 27 and 34, being sensed to bring about the temporary closing-off of the cut-outs 28 and 35, must be adjusted perfectly, and in order to prevent them from jamming in the cut-outs 28 and 35 they are provided, at their bases, with raised portions. 39, which give them enough spring force to prevent them from jamming in the said cut-outs. In order to ensure that a minimum passage persists after closure of the cut-outs 28 and 35, each of the leaf springs 27 and 34 presents a small beak 40 at its free end, these beaks 40 shortening the active spring length by an amount which is a function of the angle 41.

Figure 7:
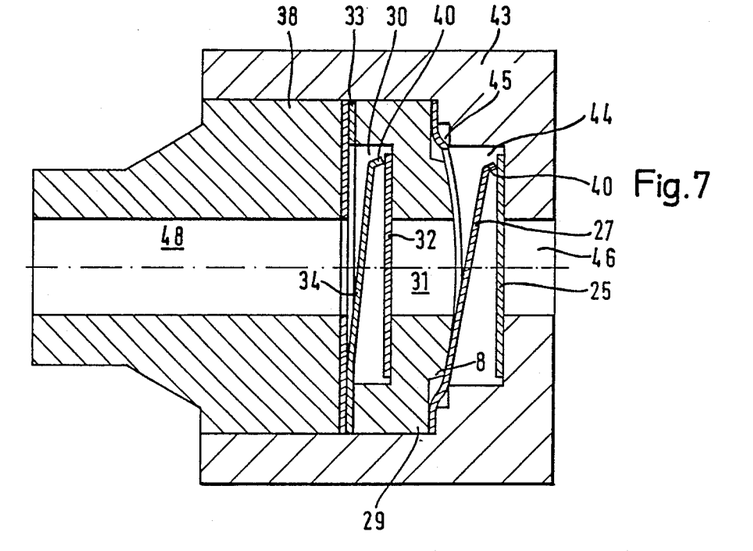
FIG. 7 shows a cross-sectional view of a fourth embodiment of a regulator, before it is used.
Figure 8:
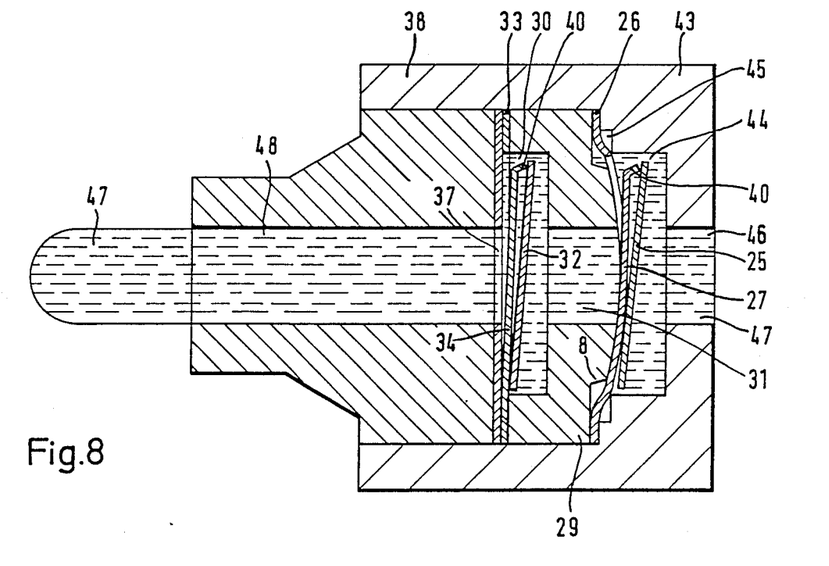
FIG. 8 shows a cross-sectional view of the regulator shown in FIG. 7, during use.

The embodiment of the regulator as shown in FIG. 4 operates in a manner which is illustrated by FIGS. 7 and 8, where the regulator is housed inside a cylinder 43, inside which a chamber 44 and an axial duct 46 are provided, the chamber 44 exhibiting a widened region 45. When the regulator is at rest, namely if no product is flowing out via the aerosol-container valve, which is not represented, the duct 46 is closed-off by the flexible disk 25, which is kept in the illustrated position by means of the leaf spring 27 belonging to the first flexible regulating disk 26, which, for its part, is kept in place by the rigid disk 29, this latter disk being provided with the protrusion 8 and the axial duct 31.

The rigid disk 29 exhibits the chamber 30, in which the flexible disk 32 is housed, held in place by the leaf spring 34 of the second flexible regulating disk 33, which bears against the flexible disk 36. The complete assembly is held in place by the dispensing device 38. When the valve, which is not represented, is opened, the product 47, expelled by the pressure acting inside the aerosol container, presses the flexible disk 25 in the downstream direction, thus opening the axial duct 46 while displacing the leaf spring 27 in the downstream direction, partially closing the cut-out 28 and leaving open only a flow cross-section which corresponds to the expulsion pressure. At the moment of maximum expulsion pressure, this passage will be minimal, by virtue of the small beak 40. Thus, at any moment while the valve is open, the product 47 can flow out via the axial duct 31, and can act on the flexible disk 32, which in its turn displaces the leaf spring 34 of the second flexible regulating disk 32 in the downstream direction, placing it over the mouth of the bore 37, this movement reducing the cross-section available for flow through this bore, to an extent which depends on the expulsion pressure but, by virtue of the small beak 40, leaving a minimum passage at any time while the valve is open, via which passage the product 47 can flow out via the dispensing device 38, through a duct 48. As the pressure expelling the product 47 falls, the leaf springs 27 and 34 press the flexible disks 25 and 32 proportionately more and more in the upstream direction, thus opening the cut-outs 28 and 35 more and more, in such a way that the product flow rate remains at least approximately constant.

Figure 9:
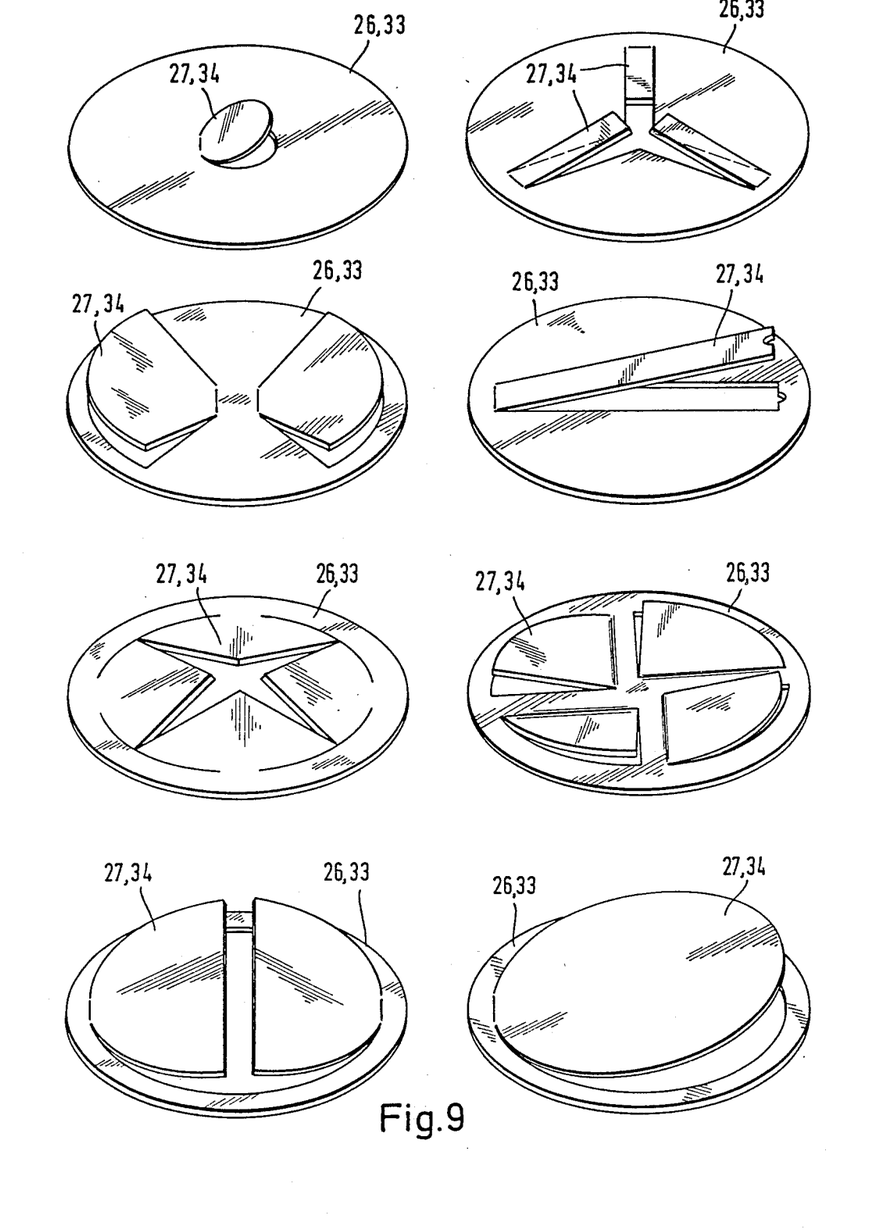
FIG. 9 shows perspective views of different variants of the regulating disk.

FIG. 9 shows advantageous variants of the flexible regulating disks 26 and 33, presenting different numbers of variously-shaped leaf springs 27 and 34, for taking account of a desired flow rate, and for taking account of the viscosity of the product 47 which is to be dispensed. The force exerted by the leaf springs 27 and 34 can be varied by varying the width over which they are attached to the flexible regulating disks 26 and 33.

Figure 10:
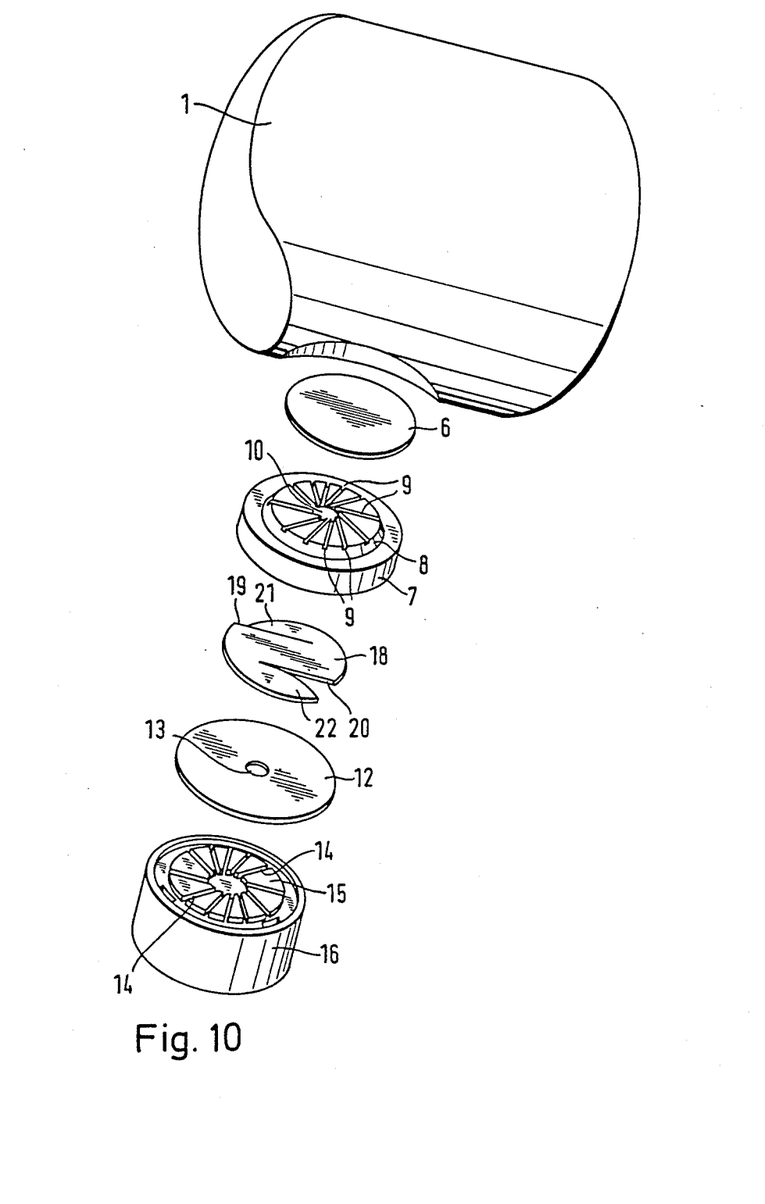
FIG. 10 shows an exploded view, in perspective, of a fifth embodiment of a regulator.

FIG. 10 shows another embodiment of a regulator, such as is advantageously utilized in the press-to-actuate head according to the invention. This regulator is intended to refine the regulation, especially for utilizing the regulator as a means of atomizing a hairspray in a manner enabling it to be applied to the hair with a cone of atomization exhibiting an angle which is as constant as possible. Given that the appearance of retardation-creating turbulence effects depends on the product viscosity, and that the viscosity of the hairspray may be variable, depending on the quality of "hold" required, the regulation due to turbulence effects has to be supplemented by another means of regulation, which in this case functions by varying the flow cross section in accordance with the variations in the expulsion pressure under which the product flows out through the regulator.

The regulator shown in FIG. 10 closely resembles the one shown in FIGS. 1 and 2, with the difference that the rigid disk 7 exhibits twelve grooves 9 in the protrusion 8, instead of six, and that a regulating disk 18 is housed between the rigid disk 7 and the sealing disk 12, inside a chamber 30 which is not visible, but which is provided in the downstream face of the rigid disk 7, just as illustrated in FIG. 4. When this regulator comes into operation, because the valve of the aerosol container has been opened, the flexible disk 6 is displaced towards the upstream face of the rigid disk 7, so that the grooves 9 become ducts, giving rise to turbulence effects at the mouth of the axial duct 10. The product then displaces the regulating disk 18 onto the upstream surface of the sealing disk 12, thus covering the bore 13. The force exerted by the leaf springs 21 and 22 is chosen to be such that a minimum flow cross-section persists between the downstream face of the regulating disk 18 and the upstream face of the sealing disk 12,; so as to guarantee a minimum flow rate when the product is being expelled under a high pressure. As the expulsion pressure falls, the leaf springs 21 and 22 relax proportionately, and lift the regulating disk 18, this lifting movement gradually increasing the flow cross-section in like proportion to the fall in the expulsion pressure.

Figure 11:
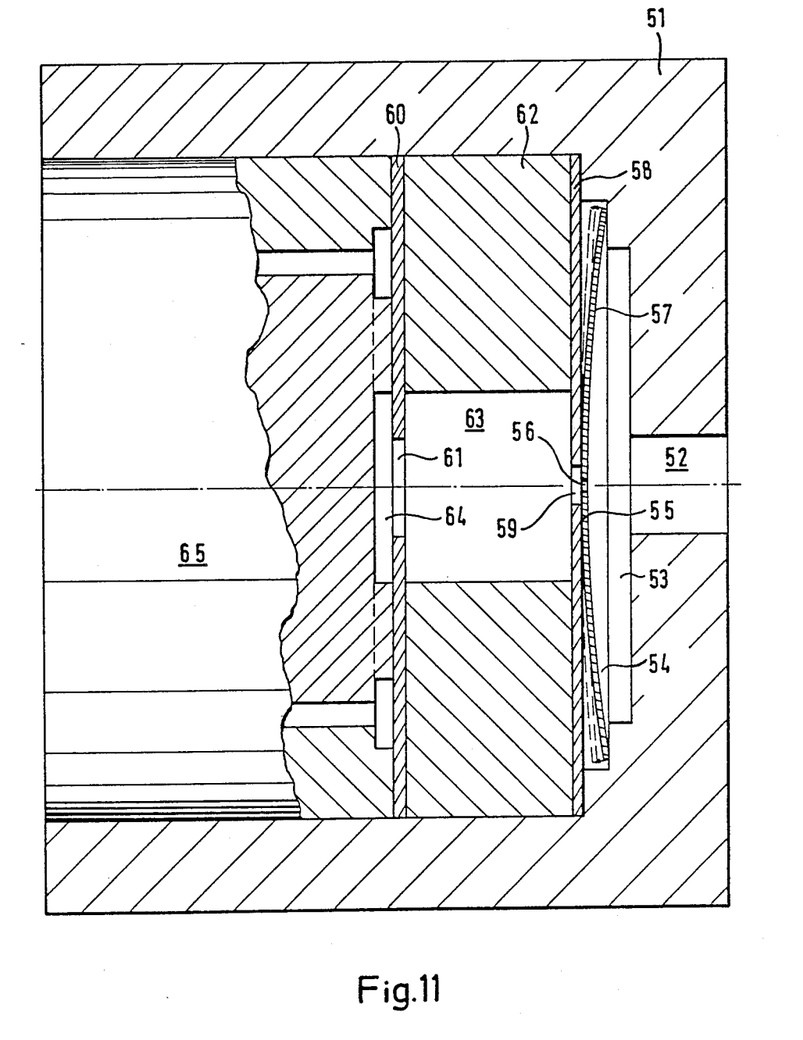
FIG. 11 shows a cross-sectional view of a sixth embodiment of the regulator.
Figure 12:
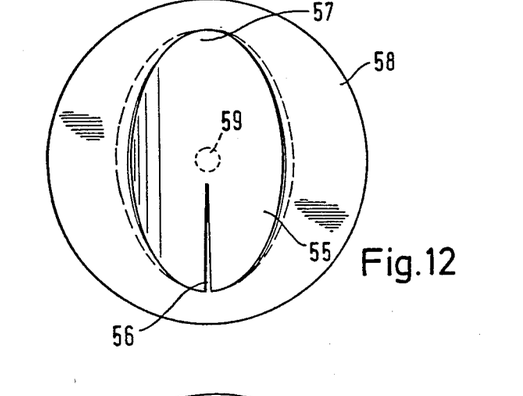
FIG. 12 shows a plan view of another variant of the regulating disk, placed on an accelerating disk.
Figures 13, 14:
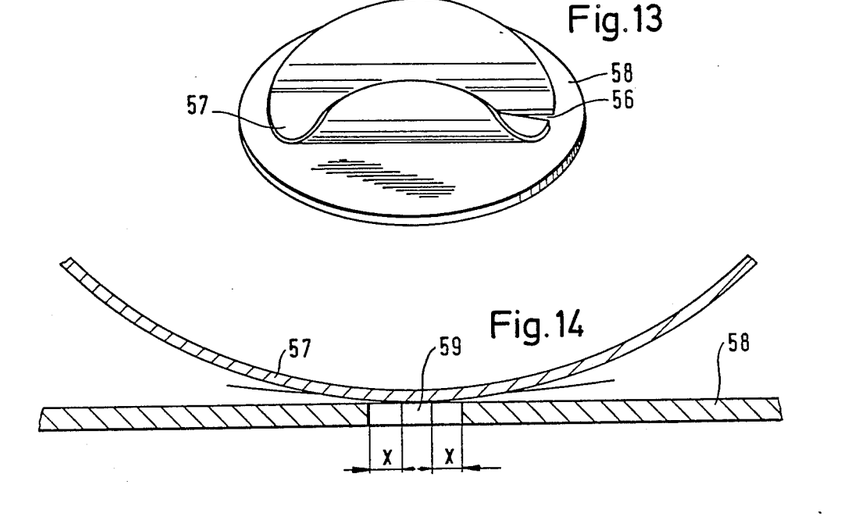
FIG. 13 shows a perspective view of the arrangement shown in FIG. 12.
FIG. 14 shows a cross-sectional view of a portion of the regulating disk shown in FIG. 12, greatly enlarged, at rest.

FIG. 11 shows a further embodiment of a regulator, housed in a cylindrical enclosure 51, exhibiting a supply duct 52, which opens into the chambers 53 and 54. A regulating disk 55 is located inside the chamber 54, this disk 55 preferably being made of stainless steel and exhibiting a notch 56, located on its centerline and in the direction in which the metal was rolled. This regulating disk 55 is given a curvature, 57, which is preferably perpendicular to the notch 56 and hence perpendicular to the direction in which the metal was rolled. The spring force resulting from the curvature 57 is very strong, giving little possibility of adjustment if the curvature is made in the direction of rolling. On the other hand, a curvature, 57, made perpendicularly to the direction of rolling offers a weaker spring force, with a wider range of adjustment. The spring force can also be adjusted with the aid of the notch 56: the greater its length, the more it reduces the spring force. On the other hand, the length of the notch 56 influences the product flow rate by extending more or less close to a through-hole 59 in an accelerating disk 58. The notch 56 is essential by reason of the fact that a very high initial pressure inside the aerosol container, for example 10 bars, could press the regulating disk 55 so hard against the accelerating disk 58 that the through hole could be closed-off. This closing-off is prevented by the notch 56. A disk 62 is located between the accelerating disk 58, with its through-hole 59, and a rigid disk 60, possessing a through-hole 61, the disk 62 exhibiting a chamber 63. The size of the through-hole 59 brings about an acceleration of the product flow, while reducing the pressure under which it is expelled, but which recovers in the chamber 63, so that the flow can be accelerated anew by the reduced size of the through-hole 61, the pressure recovering, once again, in a chamber 64, belonging to an atomizing nozzle 65. The conversion, into expulsion pressure, of the product flow velocity, occurring in the chambers 63 and 64, is favorable to the quality of regulation achieved by the regulator. It must be noted that the provision of a large through-hole 61 requires that, a higher spring force be exerted by the regulating disk 55, as opposed to when this hole 61 is small. Several parameters are therefore available for obtaining the required regulation. The thickness of the regulating disk 55 is also one of these parameters. These different parameters enable the regulator to be adjusted to suit the viscosities of the various products which are to be dispensed, ranging from water, through alcohol and oil, to products of a creamy consistency.

The disk 62 is preferably manufactured as a plastic molding, while the accelerating disk 58 and the rigid disk 60 are preferably made of stainless steel. Due to this fact, the sizes of the through-holes 59 and 61 cannot be affected by a solvent employed in an aggressive formulation, for example methylene chloride. Moreover, the accelerating disk 58 and the rigid disk 60 cover the surface blemishes on the upstream and downstream faces of the disk 60, these blemishes deriving from the molding process, an example being the marks left by an extractor.

The regulating disk 55, the accelerating disk 58, the rigid disk 60, and the disk 62 are held in place by the atomizing nozzle 65, which is preferably like the one described in European Patent No. 688, and which is firmly fixed inside the cylindrical enclosure 51, the dimensions of the said disks being chosen so as to ensure perfect sealing between their peripheries and the said enclosure 51. This atomizing nozzle 65 can be replaced by a simple tube, typically for dispensing oily or creamy products.

Figure 15:
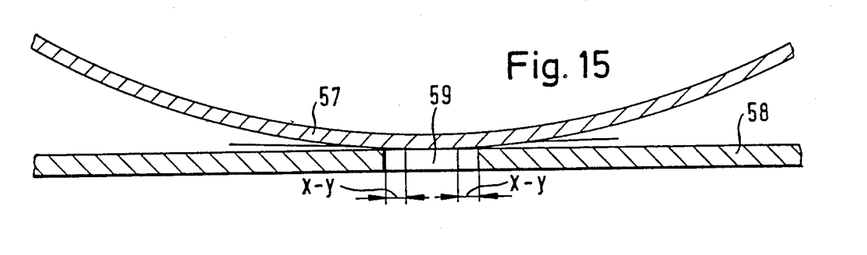
FIG. 15 shows a cross-sectional view of the portion of the regulating disk shown in FIG. 14, during use.

The regulator shown in FIG. 11 operates in a manner which is illustrated, in part, by FIGS. 12 to 15, namely as follows: at rest, when the valve of the aerosol container is closed, the disk 55 is caused to bear, by its own spring force, against the through-hole 59 in the accelerating disk 58, allowing the passages x (FIG. 14) to remain effective. As soon as the pressure acting on the product to be dispensed acts on the regulating disk 55, the curvature 57 flattens out, this flattening reducing the flow cross-section of the through-hole 59, so that x becomes x-y (FIG. 15). As the expulsion pressure acting on the product to be dispensed falls, the spring force exerted by the regulating disk 55 re-establishes the shape of the curvature 57 in like proportion, namely in proportion to the fall in the expulsion pressure prevailing in the product, and progressively opens the flow cross-section of the through-hole 59, so as to arrive, ultimately, at the cross-section which provides the flow cross-section x, in particular when the aerosol container is becoming empty. The pressure prevailing in the chamber 53 acts as a check on the inflow of product via the through-hole 59, namely as a retarding force which weakens progressively as the expulsion pressure falls, and which therefore forms one of the means of regulation possessed by the regulator that has been described.

What is claimed is:

1. A thrust regulator for dispensing a liquid at a substantially constant flow rate from a container containing said liquid and a compressed gas, said thrust regulator comprising
   a mounting enclosure having a first end and a second end, said first end having a supply duct formed therein, said supply duct connectable to a container containing a liquid and a compressed gas, said second end having an opening therein, said opening being receivable of a nozzle therein, said mounting enclosure and said nozzle, when received in said opening, defining a chamber intermediate said nozzle and said supply duct;
   first pressure-responsive flow control means, disposed in said chamber and fluidically connected to said supply duct, for inhibiting liquid flow through said supply duct in a manner substantially inversely proportional to the pressure of said compressed gas in said container;

flow retarding means, disposed in said chamber and fluidically connecting said nozzle and said first pressure-responsive flow control means, for retarding liquid flow from said first pressure-responsive flow control means to said nozzle in a manner substantially inversely proportional to the pressure of liquid exiting said first pressure-responsive flow control means;

said first pressure-responsive flow control means and said flow retarding means cooperating to maintain a substantially constant liquid flow rate through said nozzle substantially independent of the pressure of said compressed gas.

2. The thrust regulator according to claim 1, wherein said flow retarding means comprises turbulence generating means for generating turbulent flow in said liquid in substantially inverse proportion to the pressure of liquid exiting said first pressure-responsive flow control means.

3. The thrust regulator according to claim 1, wherein said flow retarding means comprises second pressure-responsive flow control means for inhibiting liquid flow from said first pressure-responsive flow control means to said nozzle in a manner substantially inversely proportional to the pressure of liquid exiting said first pressure-responsive flow control means.

4. The thrust regulator according to claim 1, wherein said flow retarding means comprises:

turbulence generating means, disposed in said chamber and fluidically connected to said first pressure-responsive flow control means, for generating turbulent flow in said liquid in substantially inverse proportion to the pressure in liquid in said supply duct; and second pressure-responsive flow control means, disposed in said chamber and fluidically connecting said turbulence generating means and said nozzle, for inhibiting liquid flow from said turbulence generating means to said nozzle in a manner substantially inversely proportional to the pressure of liquid exiting said turbulence generating means.

5. The thrust regulator according to claim 1, wherein said flow retarding means comprises first accelerating means, fluidically connected to said first pressure-responsive flow control means, for increasing the linear velocity of said liquid to a velocity greater than that in said supply duct;

pressurization means, fluidically connected to said first acceleration means, for decreasing the linear velocity of said liquid exiting said first accelerating means; and second acceleration means, fluidically connecting said pressurization means and said nozzle, for increasing the linear velocity of said liquid to a velocity greater than that in said pressurization means.

6. The thrust regulator according to claim 2, wherein said turbulence generating means comprises a rigid disk having an upstream face and an axial passage, having a periphery, therethrough, said axial passage fluidically connecting said nozzle and said first pressure-responsive flow control means, said upstream face having at least two grooves formed therein which form tangents to said periphery of said axial passage, said first pressure-responsive flow control means and said rigid disk cooperating to variably divert liquid flow from said first pressure-responsive flow control means to said nozzle into said at least two grooves and thence to said axial passage in substantially direct proportion to the pressure of liquid in said supply duct.

7. The thrust regulator according to claim 6, wherein said first pressure-responsive flow control means comprises a resilient disk abutting said upstream face of said rigid disk, said resilient disk being continuously bendable in response to liquid pressure in said supply duct between a first position permitting liquid flow though said at least two grooves and a second position substantially inhibiting liquid flow through said at least two grooves.

8. The thrust regulator according to claim 7, wherein said resilient disk has at least one notch therein.

9. The thrust regulator according to claim 3, wherein said first pressure-responsive flow control means comprises: a rigid disk, having an axial passage therethrough, disposed within said chamber so that liquid flowing from said supply duct to said nozzle must pass through said axial passage; a first flexible disk disposed in said chamber intermediate said supply duct and said rigid disk, said first flexible disk being continuously variably movable in response to liquid pressure in said supply duct between a first position inhibiting liquid flow through said supply duct and a second position permitting liquid flow through said supply duct; first biasing means, disposed intermediate said first flexible disk and said rigid disk, for yieldably urging said first flexible disk to said first position and for inhibiting liquid flow through said axial passage in substantially direct proportion to the movement of said first flexible disk from said first position to said second position; second flexible disk disposed in said chamber intermediate said rigid disk and said nozzle, said second flexible disk being continuously variably movable in response to liquid pressure in said axial passage between a first position inhibiting liquid flow through said axial passage and a second position permitting liquid flow through said axial passage; second biasing means, disposed intermediate said second flexible disk and said nozzle for yieldably urging said second flexible disk to said first position and for inhibiting liquid flow through said nozzle in substantially direct proportion to the movement of said second flexible disk from said first position to said second position.

10. The thrust regulator according to claim 9, wherein said first biasing means is incapable of completely blocking flow through said axial passage and said second biasing means is incapable of completely blocking flow through said nozzle.

11. The thrust regulator according to claim 4, wherein said turbulence generating means comprises a first rig disk having an upstream face and a first axial passage, having periphery, therethrough, said first axial passage providing fluidic communication between said nozzle and said first pressure-responsive flow control means, said upstream face having at least two grooves formed therein which form tangents to said periphery of said first axial passage, said first pressure-responsive flow control means and said rigid disk cooperating cause liquid flow from said first pressure-responsive flow control means to variably pass through said at least two grooves and thence to said first axial passage in substantially direct proportion to the pressure of liquid in said supply duct;

said first pressure-responsive flow control means comprising a first resilient disk abutting said upstream face of said rigid disk, said first resilient disk being continuously bendable in response to liquid pressure in said supply duct between a first position permitting liquid flow through said at least two grooves and a second position substantially inhibiting liquid flow through said at least two grooves;

said second pressure-responsive flow control means comprising a second rigid disk having an axial fluid passage therethrough, disposed intermediate said first rigid disk and said nozzle, and a second flexible disk, disposed intermediate said first rigid disk and said second rigid disk, said second flexible disk being continuously variably movable in response to liquid pressure in said first axial passage between a first position permitting a predetermined maximum flow through said second axial passage and a second position permitting a predetermined maximum flow through said second axial passage.

12. The thrust regulator according to claim 5, wherein said first accelerating means comprises a first rigid disk, disposed intermediate said supply duct and said nozzle, having a first axial fluid passageway therethrough, said first axial fluid passageway having a cross-sectional area less than the cross-sectional area of said supply duct;

said pressurization means comprises a second rigid disk, disposed intermediate said first rigid disk and said nozzle, having a second axial fluid passageway therethrough, said second axial, fluid passageway having a cross-sectional area greater than the cross-sectional area of said first axial fluid passageway;

said second acceleration means comprises a third rigid disk, disposed intermediate said second rigid disk and said nozzle, having a third axial fluid passageway therethrough, said third axial fluid passageway having a cross-sectional area less than the cross-sectional area of said second axial fluid passageway.

13. The thrust regulator according to claim 12, wherein said first axial fluid passageway has a cross-sectional area less than the cross-sectional area of said third axial fluid passageway.

* * * * *